United States Patent [19]

Seem

[11] 4,175,621
[45] Nov. 27, 1979

[54] FRUIT DISLODGER FOR A HARVESTING MACHINE

[76] Inventor: David M. Seem, Seem Dr., Kutztown, Pa. 19530

[21] Appl. No.: 827,475

[22] Filed: Aug. 25, 1977

[51] Int. Cl.² .................... A01D 17/00; A01D 45/00
[52] U.S. Cl. .................... 171/14; 56/327 R; 171/27
[58] Field of Search .................... 171/14, 27, 101, 94; 130/22 R, 30 R, 28; 56/16.5, 400, 327 R, 12.4, 12.5, 12.7, 16.4; 241/81.3

[56] References Cited

U.S. PATENT DOCUMENTS

| 10,058 | 3/1882 | Keller | 130/22 R |
|---|---|---|---|
| 206,489 | 7/1878 | Sargent | 130/22 R |
| 1,803,131 | 4/1931 | Pierson | 130/22 R |
| 2,030,587 | 2/1936 | Heaslet | 171/101 |
| 2,369,723 | 2/1945 | Denzinger | 171/27 |
| 2,415,675 | 2/1947 | Crossley | 241/84.3 |
| 2,587,289 | 2/1952 | Cook | 56/16.5 |
| 3,126,693 | 3/1964 | Renn | 56/400 |
| 3,199,604 | 8/1965 | Lorenzen et al. | 171/27 |
| 3,404,517 | 10/1968 | Whitfield et al. | 56/16.5 |
| 3,420,239 | 1/1969 | Lorenzen | 171/27 |
| 3,921,723 | 11/1975 | Seem | 171/14 |
| 3,986,561 | 10/1976 | Bettencourt | 171/14 |

Primary Examiner—Louis G. Mancene
Assistant Examiner—Paul J. Hirsch
Attorney, Agent, or Firm—Edward M. Farrell

[57] ABSTRACT

A tomato harvester includes means for severing tomato plants below ground and for depositing them on a movable conveyor on which the tomatoes are separated from the vines. A plurality of flexible spring-like elements extend vertically downwardly toward the conveyor and are moved transversely back and forth across the conveyor to move the flexible elements into contact with the tomato plants as they are conveyed to assist in dislodging the tomatoes from the vines.

5 Claims, 5 Drawing Figures

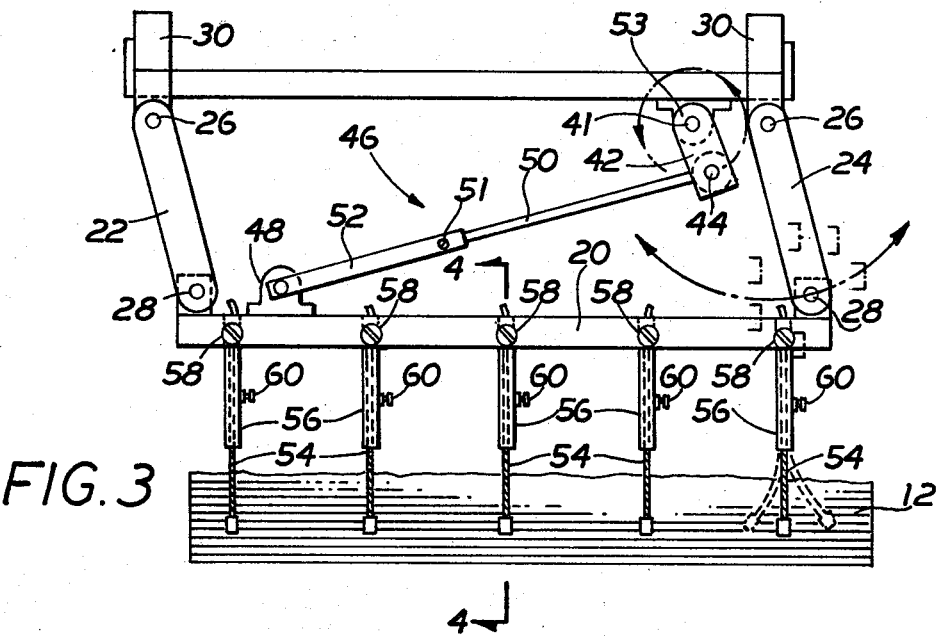
FIG. 3
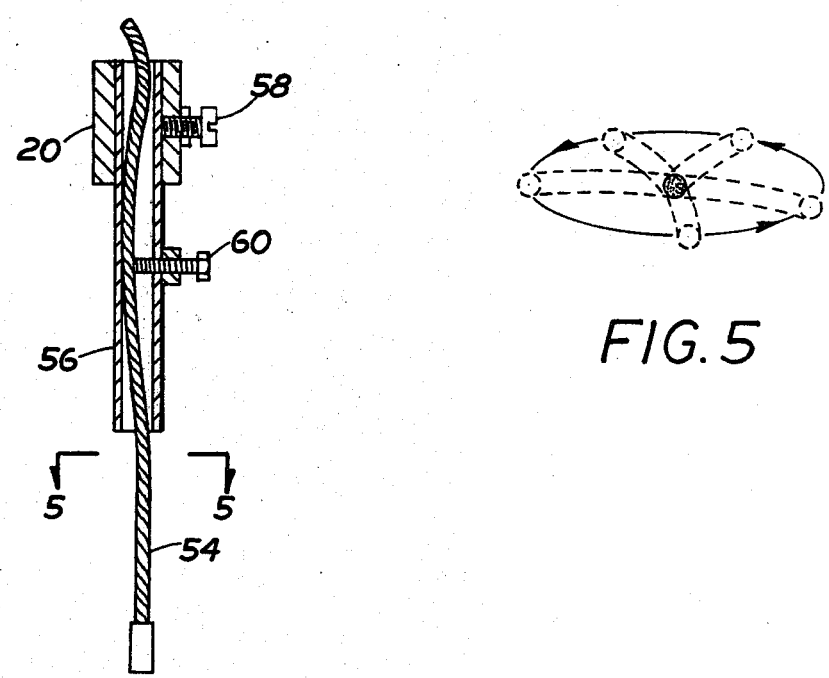
FIG. 4
FIG. 5

FRUIT DISLODGER FOR A HARVESTING MACHINE

Harvesting machines for mechanically taking whole plants from a field and shaking the tomatoes off the vines and then separating the tomatoes from their leaves, dirt and other material are well known. After all of these operations, means are generally provided for visually inspecting and sorting the tomatoes before loading them into trucks.

One of the main operations involved in the aforementioned types of harvesting machines involves the separation of the tomatoes or other crop from the vine. In the past, tomatoes have been separated by means of shakers which shake a moving conveyor chain in vertical directions resulting in the tomatoes being shaken from the vines and dropping through relatively wide openings between links in the conveyor chain onto another conveyor generally disposed below the first conveyor. The vine remaining on the top, being too large to pass through the openings in the top conveyor chain, are carried and dropped back on the field. Very often, when conventional shakers are employed, many tomatoes are not shaken from the vine and may be wasted or require labor to remove them after they have been dropped back on the field.

While some crops, such as potatoes, may be subjected to reasonably rough handling without undue damage, other crops such as tomatoes and the like are more fragile and, depending on the intended use, may be unusable if crushed or bruised. Consequently, there are limits to the amount of shaking that can be used in removing tomatoes and the like from their vines.

A number of different types of separaters and shakers have been used in the past. For example, a U.S. Pat. to Lorenzen et al, No. 3,286,774, discloses the use of a plurality of rubber cones extending vertically downwardly over a belt with the cones serving to spread over and combine the vines as they are moved upwardly and shaken. A U.S. Pat. to Bettencourt et al, No. 3,986,561, discloses a shaker having a plurality of regularly spaced apart vertically and upwardly inverted Vee projections, with the projections extending into the tomato plant to impart a more rigorous agitation of the plant. A U.S. Pat. to Denlinger, No. 2,369,723, discloses a plurality of spring fingers which are used to retard the rearward movement of the vines for better separation of potatoes therefrom.

It is an object of this invention to provide a tomato harvester having improved means for physically dislodging tomatoes from the vines after they have been cut in a field.

It is a further object of the present invention to provide a tomato harvester with improved means for physically dislodging tomatoes from the vines after they have been cut and conveyed and while they are being carried on a conveyor chain.

It is still a further object of this invention to provide a tomato harvester with improved means for physically dislodging tomatoes from their vines as they are conveyed, with the means being adjustable to accommodate different sized crops and to apply different degrees of force in the dislodging operation.

In accordance with the present invention, a tomato harvester includes cutting means for severing tomato plants below the ground and for depositing the severed plant on a movable conveyor chain on which the tomatoes are separated from the vine. Conventional shakers may be used with the conveyor chain in conjunction with the present invention. The separated tomatoes are dropped between links in the conveyor chain through relatively wide openings onto a second conveyor with the vines being carried and dropped back onto the field by the top conveyor. Means for physically dislodging the tomatoes from the vines as the tomato plants are being conveyed on the conveyor are provided. These means include a plurality of frame members connected to the main frame of the harvester. A plurality of cross bars are pivotally connected to the frame members and disposed to be moved over the conveyor chain transverse to the direction of movement thereof. A plurality of flexible elements are connected to each of the cross bars and extend vertically downwardly toward the conveyor. The flexible elements are moved transversely back and forth across the conveyor to move the flexible elements into contact with the tomato plants as they are conveyed to assist in dislodging the tomatoes from the vines. The various cross bars with the flexible element are moved out of phase with respect to each other. Means are provided to variably adjust the stiffness and heights of the flexible elements.

Other objects and advantages of the present invention will be apparent and suggest themselves to those skilled in the art, from a reading of the following specification and claims, taken in conjunction with the accompanying drawing, in which:

FIG. 3 is a front view of a portion of a tomato dislodger as illustrated in FIG. 2;

FIG. 4 is a cross-sectional, enlarged view taken along line 4—4 of FIG. 3; and

FIG. 5 is a cross-sectional view taken along line 5—5 illustrating during operation the movement of the flexible arm of FIG. 4.

Figure 1:
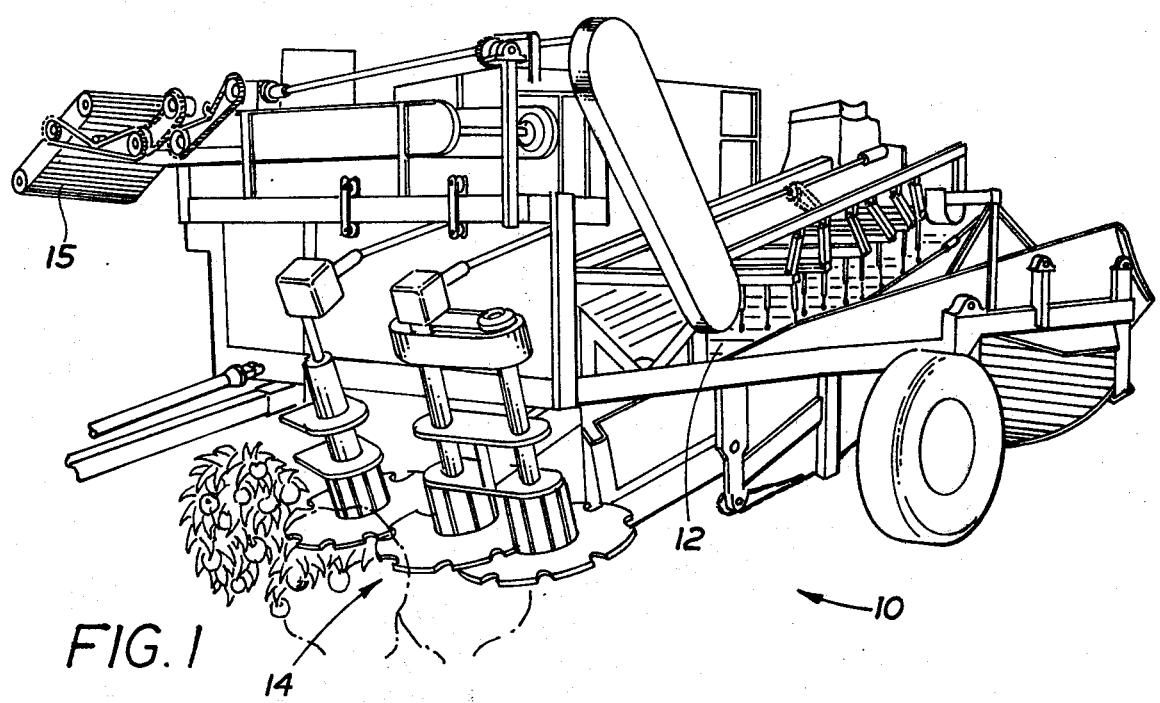
FIG. 1 is a perspective view of a harvesting machine in which the present invention may be employed.

Referring particularly to FIG. 1, a harvesting machine 10 could include the various of the elements found in conventional machines. Because of this, detailed explanations will not be given since the operation of most of the parts illustrated are well known to those skilled in the art and are not directed to the invention involved.

The present invention is concerned primarily with a top conveyor chain 12 and means for dislodging the fruit as it is being conveyed on the conveyor chain 12. The conveyor belt 12 is a chain type conveyor having spaces between links wide enough to permit tomatoes to fall through once they are separated from the vines. The vines, generally being longer than the largest dimension of the tomatoes, tend to remain on the conveyor chain 12 and are dumped back onto the field as the conveyor chain reaches the end of its travel. The conveyor chain is in the form of an endless belt with the top portions moving at a slight angle upwardly from the front of the harvesting machine towards the rear.

Various types of shakers may be used in connection with the conveyor chain 12 to vibrate it up and down at a relatively high frequency. One such a shaker may be of the type described in a copending application of the same inventor entitled "Vibrating Apparatus for a Harvesting Machine", Ser. No. 569,802 filed Apr. 21, 1975. The tomatoes are generally dropped between the links 13 of the conveyor chain 12 onto a second conveyor (not illustrated) running parallel below the conveyor chain 12. A second conveyor may be a chain-type conveyor similar to the conveyor chain 12, except that its links would be more closely spaced than the spacing of the links of the conveyor chain 12. Thus, the crops, such as tomatoes, having diameters larger than the spacings of the links, are retained on the bottom conveyor chain. The bottom conveyor with the tomatoes carries the tomatoes to the next point of operation which may be still another conveyor. Ultimately the tomatoes are passed through various operations such as vacuum cleaning, if necessary, where dirt and excess leaves are removed. The tomatoes are finally delivered to a point where they are visually inspected, manually sorted and loaded into a truck.

The tomato crop is cut by a set of three cutters 14. The set of cutters may include a set of four cutters of a type described in U.S. Pat. No. 3,921,723 issued on Nov. 25, 1975, issued to the same inventor involved in the present application.

After being conveyed from the set of cutters 14 onto the conveyor chain 12 and passing through the different operations previously outlined, the tomatoes are passed to a final or loading conveyor 15 which may be an extendable boom type conveyor adapted to be expanded or contracted to reach a truck at different distances. The conveyor 15 is only incidental to the subject invention and therefore will not be described any further.

The present invention, as may be incorporated in a conventional harvester machine, will now be described in detail.

Figure 2:
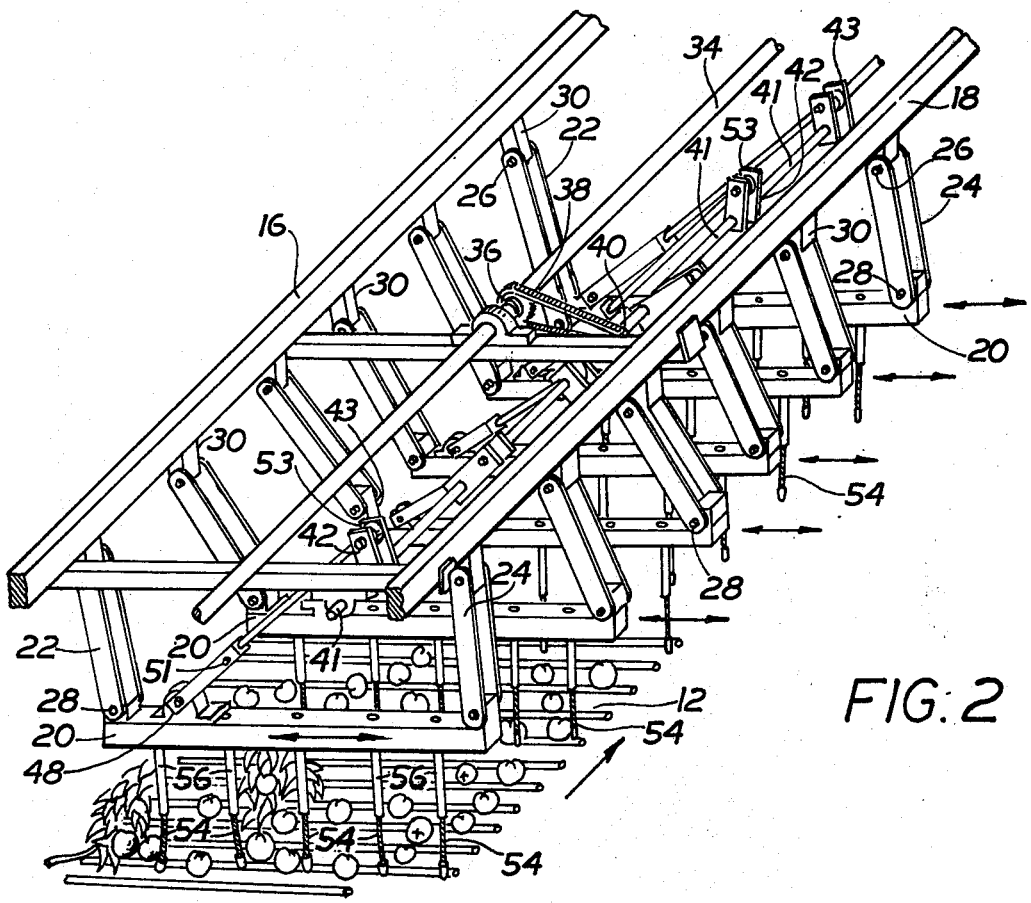
FIG. 2 is a perspective view of a fruit or tomato dislodger as used in the harvesting machine of FIG. 1 in accordance with the present invention.

Referring to FIGS. 2 and 3, along with FIG. 1, a pair of frame members 16 and 18 are suitably secured to the main frame of the harvester machine and extend longitudinally over the conveyor chain 12 in the direction of movement thereof. A plurality of transverse bar members 20 are connected to a plurality of pairs of pivotable arm members 22 and 24 and are disposed to be moved in a direction transverse with respect to the movement of the conveyor chain 12. The pairs of pivotable arm members 22 and 24 connect the bar members 20 to the frame members 16 and 18, respectively.

Each of the arm members 22 and 24 include top pins 26 which are adapted to be connected to spaced extensions 30 which are secured to bottom portions of the frame members 16 and 18. Bottom pins 28 are connected to extensions 32 which are secured to top portions at opposite ends of the transverse bars 20. The transverse bar members 20 are adapted to be swung back and forth out of phase with respect to each other, in a manner to be described.

Each of the pivot arrangements illustrated in FIG. 2 is similar to the arrangement illustrated in FIG. 3. The main difference is that each of the bar members and its associated pivotable arm members are connected to be moved out of phase with respect to the others, as will be described. A motor (not illustrated) is adapted to drive a shaft 34. The motor may be driven by power from the tractor used for transporting the harvester machine 10. The shaft 34 includes a gear wheel 36 fixedly secured thereto to move a chain drive 38. The chain drive 38 is connected to a second gear 40 which is fixedly mounted to one of a plurality aligned tubular shaft like elements 41. The relatively short similar type shaft like aligned elements 41 interconnect a plurality of pairs of crank arms 42 and 43, with only one of the crank arms 42 being illustrated in FIG. 3. When the shaft 34 is rotated to drive the chain drive, all of the interconnected shaft like elements 41 and their associated crank arms 42 and 43 are also rotated.

Each of the pairs of crank arms 42, 43 are secured to the interconnecting shaft like elements 41 out of phase with respect to each other. Each of the pairs of crank arms 42, 43 include a tubular bearing or pins 44 connected by any suitable means to maintain spacing between the crank arms 42 and 43 and to receive a driving arm of sleeve 50 as will be described.

As illustrated, the gear 40 is connected to drive the plurality of shaft-like elements 41 which in turn are connected to rotate the crank arms 42 and 43. The tubular bearings or pins 44 connected inside of the crank arms 42 and 43 are disposed on opposite ends of the crank arms with respect to the outer shaft-like elements 41. Brackets 48 are disposed on each of the transverse bar members 20. A connecting rod arrangement 46 includes a slidable shaft 50 disposed to ride in a sleeve 52. One end of the shaft 50 includes a circular ring-like portion 53 (FIG. 2). In assembly, the portion 53 is first inserted between the crank arms 42 and 43, with the bearing or pin 44 then being inserted to hold the shaft 50 in place. The total length of the shaft 50 and the sleeve 52 may be adjustable with the shaft 50 being held in place at a fixed position by a set screw 51. The final position of the shaft 50 is dependent on the desired angular relationship of the crank arm 42 and 43, which may be varied in accordance with the length of the connecting rod arrangement 46. For example, if the shaft 50 is moved inwardly within the sleeve 52 in FIG. 3, the arms 42 and 43 will be positioned in a more clockwise direction than the direction illustrated. In like manner, if the sleeve 50 is moved out of the sleeve 52, the position of the crank arms 42 and 43 will be counter-clockwise with respect to the position illustrated in FIG. 3.

Crank arms 42 and 43 are driven to rotate when the shaft 34 is rotated by means previously described. When the crank arms 42 and 43 are rotated, end portions 53 of all the shafts 50 are also rotated. All of the pairs of crank arms 42 and 43 are rotated at the same speed. However, because of the different lengths of the connection rods 53, the pairs of crank arms 42 and 43 are constantly rotated at different angles with respect to each other. When the crank arms 42 and 43 are rotated, the cross bar members 20 are moved transversely with respect to the conveyor chain 12 and at different positions with respect to each other.

Referring to FIGS. 4 and 5, along with FIG. 3, a plurality of flexible finger-like elements 54 are disposed within tubular elements 56, which in turn are connected to and extend downwardly from the arms 20 toward the conveyor 12. The finger-like elements 54, which may for example be multi-strand steel or other material, may be flexible.

Referring particularly to FIG. 4, the tubular elements 56 are adjustable and may be extended upwardly or downwardly into its transverse bar member 20. The tubular element 56 is held in position by means of screws 58 which threadedly engage the cross-bar members 20. Likewise, the flexible elements 54 may be adjustable upwardly or downwardly within the tubular elements 56 and held in place by means of screws 60, which threadedly engages the tubular elements 56.

When the cross bar members 20 are moved transversely with respect to the direction of movement of the movable conveyor chain 12, flexible elements 54 are also moved transversely across the conveyor chain 12. However, when plants are on the conveyor chain 12, because the elements 54 contact the vines and tomatoes being conveyed, they tend to move in an irregular direction, such as an oval direction illustrated in FIG. 5 instead of linearly. Because the flexible elements 54 are connected to the transverse cross-bars 20, the flexible elements 54 on one cross bar 20 are not moved simultaneously in the same direction with the flexible elements 54 connected to the other transverse bars 20.

In the example illustrated, each of the bar members 20 includes five flexible elements 54 extending therefrom. They are six cross-bars 20 making a total number of flexible elements thirty. Because the rows of flexible elements 54 are not being moved simultaneously in the same direction, all of the flexible elements 54 are in different places and constantly changing position. With the swinging of the flexible elements 54 in irregular directions, the flexible elements 54 occupy a substantial portion of the conveyor belt during operation. This assures that a substantial amount of the tomatoes are dislodged from the vines before the vines are dropped back onto the field.

During operation, the flexible elements 54 physically contact the tomatoes (or other fruit) on the vine and physically dislodge them. At the same time, the contact and physical force applied is not sufficient to harm or bruise the tomatoes, because of the flexibility of the flexible elements 54.

At the same time that the flexible elements 54 are dislodging the tomatoes from the vines, the chain 12 may be vibrated vertically upwardly and downwardly. The combined vibrations and the dislodging operation provided by the present invention result in more tomatoes being removed from the vine before the vines are dumped back on the field.

As previously mentioned, the tomatoes are generally dropped from the conveyor chain 12 onto a second conveyor running below and generally parallel to the conveyor chain 12. A second conveyor is not shown in detail, because it is not directed towards the invention, but generally is of a chain type conveyor having links which are more closely spaced than the spacing of the links of the conveyor 12 so that crops, such as tomatoes will be retained on the belt. The bottom conveyor with the tomatoes not illustrated generally carries the tomatoes to the next point of operation which may be another conveyor belt. Ultimately, the tomatoes are passed through various operations such as vacuum cleaning if necessary. The tomatoes are finally delivered to a point where they are visually inspected, manually sorted and dropped onto a loading truck.

The flexible elements 54 may be adjusted up or down with respect to the conveyor chain 12 by moving their associated tubular elements 56 up or down into the cross bars 20. Thus, adjustments in heights may be made to accommodate different crops and different sizes of the same crops. When the tubular members 56 are adjusted up or down, the stiffness or flexibility of the flexible elements 54 are not substantially affected.

When it is desired to change the degree of stiffness or flexibility of the elements 54, they are moved upwardly or downwardly within the tubular elements 56 and secured in place. In general, the shorter the lengths of the portions of the flexible elements 54 extending from the tubular elements 56, the stiffer the elements 54 will be. Likewise, the longer the lengths of the portions of the flexible elements 54 extending from the tubular elements 56, the more flexible or less stiff the flexible elements 54 will be.

It is likely that adjustments for stiffness and heights of the flexible elements 54 will be interdependent and may require more than one adjustment before the desired operation is achieved.

What is claimed is:

1. In combination with a tomato harvester having a main frame, cutting means for severing tomato plants below ground, and means for depositing the severed plants on a movable conveyor on which the tomatoes are separated from the vines, means for physically dislodging tomatoes from the vines as said tomato plants are being conveyed on said conveyor comprising:
    (a) a pair of frame members connected to said main frame and extending longitudinally over said conveyor in the direction of movement of said conveyor,
    (b) a plurality of cross bars connected to said frame members are disposed over said conveyor to swing back and forth out of the phase with one another transverse to the direction of movement of said conveyor,
    (c) a plurality of flexible spring-like elements connected to each of said cross bars extending vertically downwardly towards said conveyor,
    (d) the ends of said flexible elements being spaced from said conveyor, and
    (e) means for moving said cross bars transversely back and forth across said conveyor to move said flexible elements into contact with said tomato plants as they are conveyed to assist in dislodging the tomatoes from said vines.

2. The combination as set forth in claim 1 wherein pivotable arms are connected between said pair of frame members and said cross bars to provide said means for moving said cross bars back and forth across said conveyor.

3. The combination as set forth in claim 2 wherein a plurality of holder elements are provided to receive said flexible elements therein, said plurality of holder elements being movably mounted to said cross bar to permit vertical movements of said flexible elements to control the distance between said flexible elements and said conveyor.

4. The combination as set forth in claim 3 wherein said flexible elements are adjustably mounted in said holder elements to permit said flexible elements to be moved vertically therein to control the degree of flexibility of said flexible elements.

5. In combination with a tomato harvester having a main frame, cutting means for severing tomato plants below ground, and means for depositing the severed plants on a movable conveyor on which the tomatoes are separated from the vines, means for physically dislodging tomatoes from the vines as said tomato plants are being conveyed on said conveyor comprising:
    (a) plurality of frame members connected to said main frame,
    (b) cross bars connected to said frame members and disposed over said conveyor transverse to the direction of movement thereof,
    (c) pivotable arms connected between said main frame and said cross bars to permit transverse movement of said cross bars, (d) a plurality of flexible elements connected to each of said cross bars extending vertically downwardly towards said conveyor,
(e) the ends of said flexible elements being spaced from said conveyor,
(f) a plurality of holder elements for receiving said flexible elements therein movably mounted to said cross bar to permit vertical movements of said flexible elements to control the distance between said flexible elements and said conveyor,
(g) means for adjustably mounting said flexible elements in said holder elements to permit said flexible elements to be moved vertically therein to control the degree of flexibility of said flexible elements,
(h) means for moving said cross bars transversely back and forth across said conveyor out of phase with respect to each other to move said flexible elements into contact with said tomato plants as they are conveyed to assist in dislodging the tomatoes from said vines, and
(i) a plurality of driven crank arms with a plurality of connecting rods of variable lengths being connected between said crank arms and said cross bars, with said cross bars being driven out of phase with respect to each other in accordance with the lengths of said cross bars.

* * * * *